United States Patent
Kusatani et al.

(10) Patent No.: US 10,252,743 B2
(45) Date of Patent: Apr. 9, 2019

(54) ELECTRIC POWER STEERING DEVICE

(71) Applicant: Honda Motor Co., Ltd., Tokyo (JP)

(72) Inventors: Masaya Kusatani, Saitama (JP);
Norifumi Tamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/629,761

(22) Filed: Jun. 22, 2017

(65) Prior Publication Data

US 2017/0369093 A1  Dec. 28, 2017

(30) Foreign Application Priority Data

Jun. 22, 2016 (JP) .................................. 2016-123406

(51) Int. Cl.

| | | |
|---|---|---|
| *H02H 7/09* | (2006.01) | |
| *B62D 5/04* | (2006.01) | |
| *H02P 21/22* | (2016.01) | |
| *H02P 29/032* | (2016.01) | |
| *B62D 6/00* | (2006.01) | |
| *H02P 27/08* | (2006.01) | |
| *H02P 29/024* | (2016.01) | |

(52) U.S. Cl.
CPC ......... *B62D 5/0472* (2013.01); *B62D 5/0463* (2013.01); *B62D 6/00* (2013.01); *H02P 21/22* (2016.02); *H02P 27/08* (2013.01); *H02P 29/024* (2013.01); *H02P 29/032* (2016.02)

(58) Field of Classification Search
CPC ............................. B62D 5/0472; H02P 21/22
USPC ..................................................... 318/400.22
See application file for complete search history.

(56) References Cited

U.S. PATENT DOCUMENTS

| | | | | |
|---|---|---|---|---|
| 8,958,951 | B2 * | 2/2015 | Mikamo | B62D 5/0463 701/41 |
| 2012/0145472 | A1 * | 6/2012 | Imamura | B62D 5/046 180/446 |
| 2012/0176069 | A1 * | 7/2012 | Sagami | B62D 5/0487 318/400.02 |
| 2014/0074357 | A1 * | 3/2014 | Hisazumi | B62D 5/0481 701/42 |

(Continued)

FOREIGN PATENT DOCUMENTS

| | | |
|---|---|---|
| JP | 2010137627 | 6/2010 |
| JP | 2011130583 | 6/2011 |

(Continued)

OTHER PUBLICATIONS

"Office Action of Japan Counterpart Application," dated Feb. 13, 2018,with English translation thereof, p. 1-p. 6, in which the listed references were cited.

(Continued)

*Primary Examiner* — Erick Glass
(74) *Attorney, Agent, or Firm* — JCIPRNET

(57) ABSTRACT

An electric power steering device is provided, easing a sense of incongruity that a driver feels with respect to steering. If an abnormal phase is detected, an electronic control unit (ECU) 50 stops energizing a winding (any one of windings 86u, 86v and 86w) of the abnormal phase and energizes windings (two of the windings 86u, 86v and 86w) of the two phases other than the abnormal phase, and, as a vehicle speed V increases, the ECU 50 reduces a current value applied to the windings (two of the windings 86u, 86v and 86w) of the two phases other than the abnormal phase.

3 Claims, 17 Drawing Sheets

(56) References Cited

U.S. PATENT DOCUMENTS

2014/0300305 A1* 10/2014 Itamoto ..................... H02P 6/12
318/474

FOREIGN PATENT DOCUMENTS

| | | |
|---|---|---|
| JP | 2012-056403 | 3/2012 |
| JP | 2012-065416 | 3/2012 |
| JP | 2012-147531 | 8/2012 |
| JP | 2012-147532 | 8/2012 |

OTHER PUBLICATIONS

"Decision of Refusal of Japan Counterpart Application," dated Sep. 4, 2018, with English translation thereof, p. 1-p. 6.
"Office Action of China Counterpart Application," with English translation thereof, dated Dec. 21, 2018, p. 1-p. 13.

* cited by examiner

ELECTRIC POWER STEERING DEVICE

CROSS-REFERENCE TO RELATED APPLICATION

This application claims the priority benefit of Japan Application no. 2016-123406, filed on Jun. 22, 2016. The entirety of the above-mentioned patent application is hereby incorporated by reference herein and made a part of this specification.

BACKGROUND OF THE INVENTION

Field of the Invention

The invention relates to an electric power steering device applying, from a motor, a force (steering assist force) that assists a driver's steering during operation of a steering handle.

Description of the Related Art

An electric power steering device provided in a vehicle generates a steering assist force by driving an electric motor. As the electric motor, for example, a three-phase alternating current (AC) motor having U-phase, V-phase and W-phase windings is used. The three-phase AC motor cannot be driven any more in normal control when an abnormality such as disconnection or the like occurs in any phase. Patent Documents 1 and 2 disclose a control (referred to as abnormality occurrence state energization control) driving a motor (brushless motor) using the remaining two phases other than a phase (referred to as abnormal phase) in which an abnormality has occurred. In the inventions of Patent Documents 1 and 2, in cases where the motor is driven by the abnormality occurrence state energization control, when a magnetic pole of a rotor passes over, for example, a U-phase winding, V-phase and W-phase currents are increased.

PRIOR-ART LITERATURE

Patent Literature

Patent Literature 1: Japanese Unexamined Patent Publication No. 2012-147531
Patent Literature 2: Japanese Unexamined Patent Publication No. 2012-147532

SUMMARY OF THE INVENTION

Problems to be Solved by the Invention

According to the inventions of Patent Documents 1 and 2, since a fluctuation range of a current of the motor increases, and a fluctuation range of the steering assist force also increases, a driver sometimes feels a sense of incongruity for a steering operation. For example, when the current suddenly increases, since the steering assist force suddenly increases, the driver feels a sense of incongruity that steering force is temporarily reduced. When the current suddenly decreases, since the steering assist force suddenly decreases, the driver feels a sense of incongruity that the steering force is temporarily increased. Such change in the steering assist force notably occurs when the vehicle travels at high speed or when a steering handle is operated within a predetermined range (steering angle neutral point) including a zero steering angle.

In addition, when the magnetic pole of the rotor passes through the abnormal phase, to increase a phase current and change it into high-duty, a power supply current supplied to the motor from a power source such as a battery or the like is increased. However, there are fears that if the power supply current continues to be large, a fuse of the vehicle may be blown. To prevent this, it is necessary to limit the power supply current when the magnetic pole of the rotor passes through the abnormal phase. However, when the power supply current is limited, the steering assist force decreases, and the driver experiences a feeling that the steering wheel sticks in the steering direction.

The invention is made in view of such problems and aims to provide an electric power steering device easing a sense of incongruity that the driver feels with respect to steering.

Means for Solving the Problems

A first invention is an electric powersteering device, including: a three-phase AC motor having windings of three phases; a drive circuit energizing each of the windings of the motor in order to excite the windings; a drive control device controlling the drive circuit; and an abnormal phase detection unit detecting an abnormal phase being a phase among the three phases in which an abnormality has occurred. The electric power steering device further includes a vehicle speed sensor detecting a vehicle speed. If the abnormal phase is detected by the abnormal phase detection unit, the drive control device controls the drive circuit so as to stop energizing the winding of the abnormal phase and to energize the windings of the two phases other than the abnormal phase, and, as the vehicle speed detected by the vehicle speed sensor increases, the drive control device reduces a current value applied to the windings of the two phases other than the abnormal phase.

According to the first invention, if the abnormal phase is detected, the energization to the winding of the abnormal phase is stopped and the windings of the two phases other than the abnormal phase are energized, and, on that occasion, as the vehicle speed increases, the current value applied to the windings of the two phases other than the abnormal phase is reduced. In this way, in abnormality occurrence state energization control, since a steering assist force is reduced during high-speed traveling of a vehicle during which a driver feels a sense of incongruity for steering, the driver's sense of incongruity with respect to steering can be eased. In addition, since the steering assist force is reduced during high-speed traveling of the vehicle, the vehicle can travel stably.

If the vehicle speed detected by the vehicle speed sensor is equal to or higher than a predetermined vehicle speed, the drive control device may control the drive circuit so as to stop energizing the windings of the two phases other than the abnormal phase. In this way, since energization is stopped to set the steering assist force to zero in a situation where the driver feels a sense of incongruity with respect to steering assist during high-speed traveling of the vehicle, the driver's sense of incongruity with respect to steering can be eliminated.

A second invention is an electric power steering device, including: a three-phase AC motor having windings of three phases; a drive circuit energizing each of the windings of the motor in order to excite the windings; a drive control device controlling the drive circuit; and an abnormal phase detection unit detecting an abnormal phase being a phase among the three phases in which an abnormality has occurred. The electric power steering device further includes a steering angle sensor detecting a steering angle. If the abnormal phase is detected by the abnormal phase detection unit, the drive control device controls the drive circuit so as to stop energizing the winding of the abnormal phase and to energize the windings of the two phases other than the abnormal phase, and, when the steering angle detected by the steering angle sensor is within a predetermined range including zero, the drive control device reduces a current value applied to the windings of the two phases other than the abnormal phase to be smaller than when the steering angle is outside the predetermined range.

According to the second invention, if the abnormal phase is detected, the energization to the winding of the abnormal phase is stopped and the windings of the two phases other than the abnormal phase are energized, and, on that occasion, when the steering angle is within the predetermined range including zero, the current value applied to the windings of the two phases other than the abnormal phase is reduced to be smaller than when the steering angle is outside the predetermined range. In this way, in the abnormality occurrence state energization control, since the steering assist force is reduced in the vicinity of a steering angle neutral point at which the driver feels a sense of incongruity for steering, the driver's sense of incongruity with respect to steering can be eased.

If the steering angle detected by the steering angle sensor is within the predetermined range, the drive control device may control the drive circuit so as to stop energizing the windings of the two phases other than the abnormal phase. In this way, since energization is stopped to set the steering assist force to zero in the vicinity of the steering angle neutral point at which the driver feels a sense of incongruity with respect to steering assist, the driver's sense of incongruity with respect to steering can be eliminated.

Effects of the Invention

According to the invention, in the abnormality occurrence state energization control, since the steering assist force is reduced in the situation where the driver feels a sense of incongruity for steering, the driver's sense of incongruity with respect to steering can be eased.

DESCRIPTION OF THE EMBODIMENTS

Hereinafter, a preferred embodiment of an electric power steering device according to the invention is provided and is explained in detail with reference to the accompanying drawings. Moreover, the configuration that forms the basis for the following embodiments and normal state energization control performed in the following embodiments are disclosed in the above Patent Documents 1 and 2 (JP 2012-147531 and JP 2012-147532).

I. Embodiment

A. Explanation of Configuration

1. Entire Electric Power Steering Device 10

Figure 1:
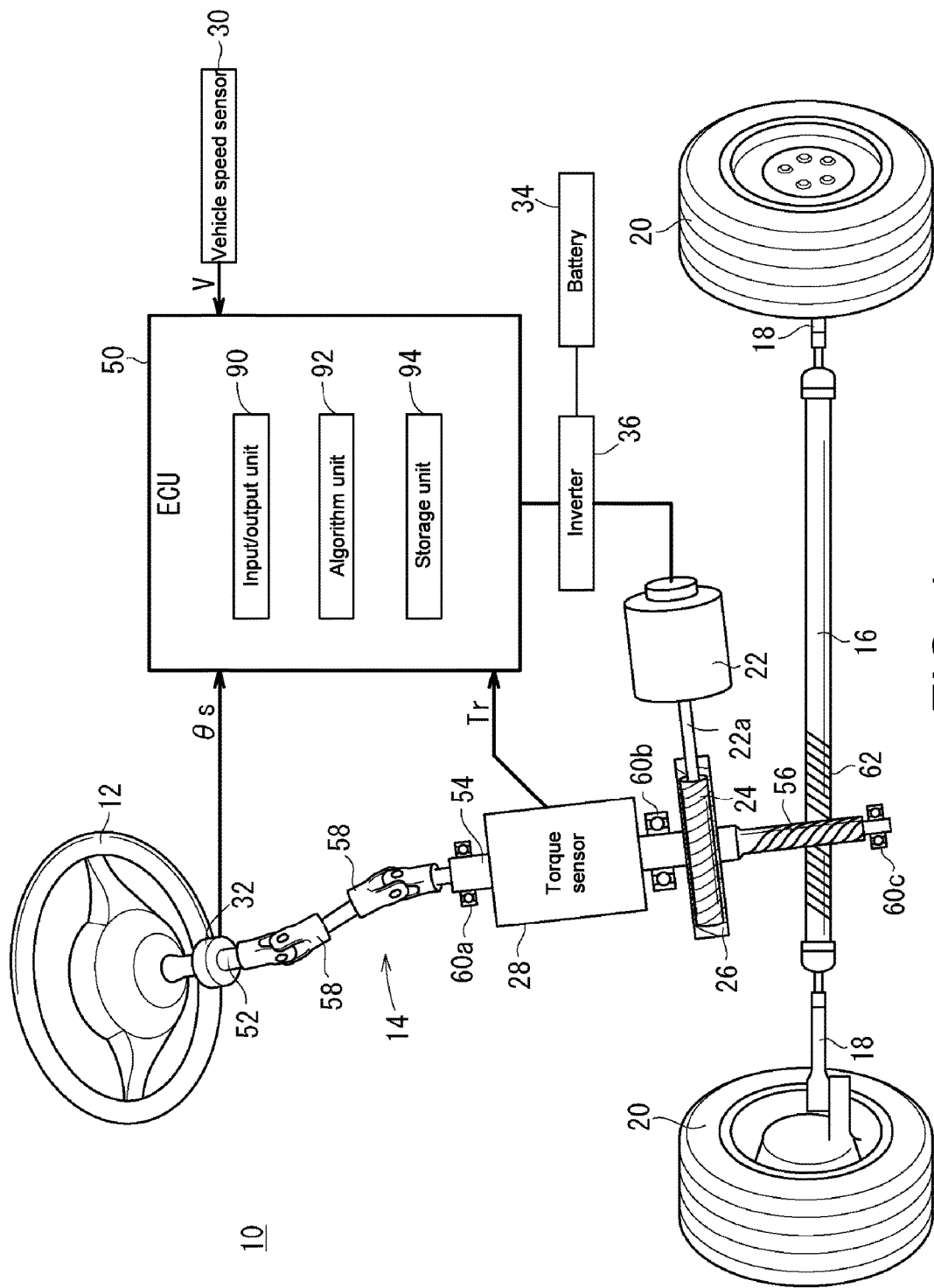
FIG. 1 is a schematic configuration diagram of an electric power steering device according to one embodiment of the invention.
Figure 2:
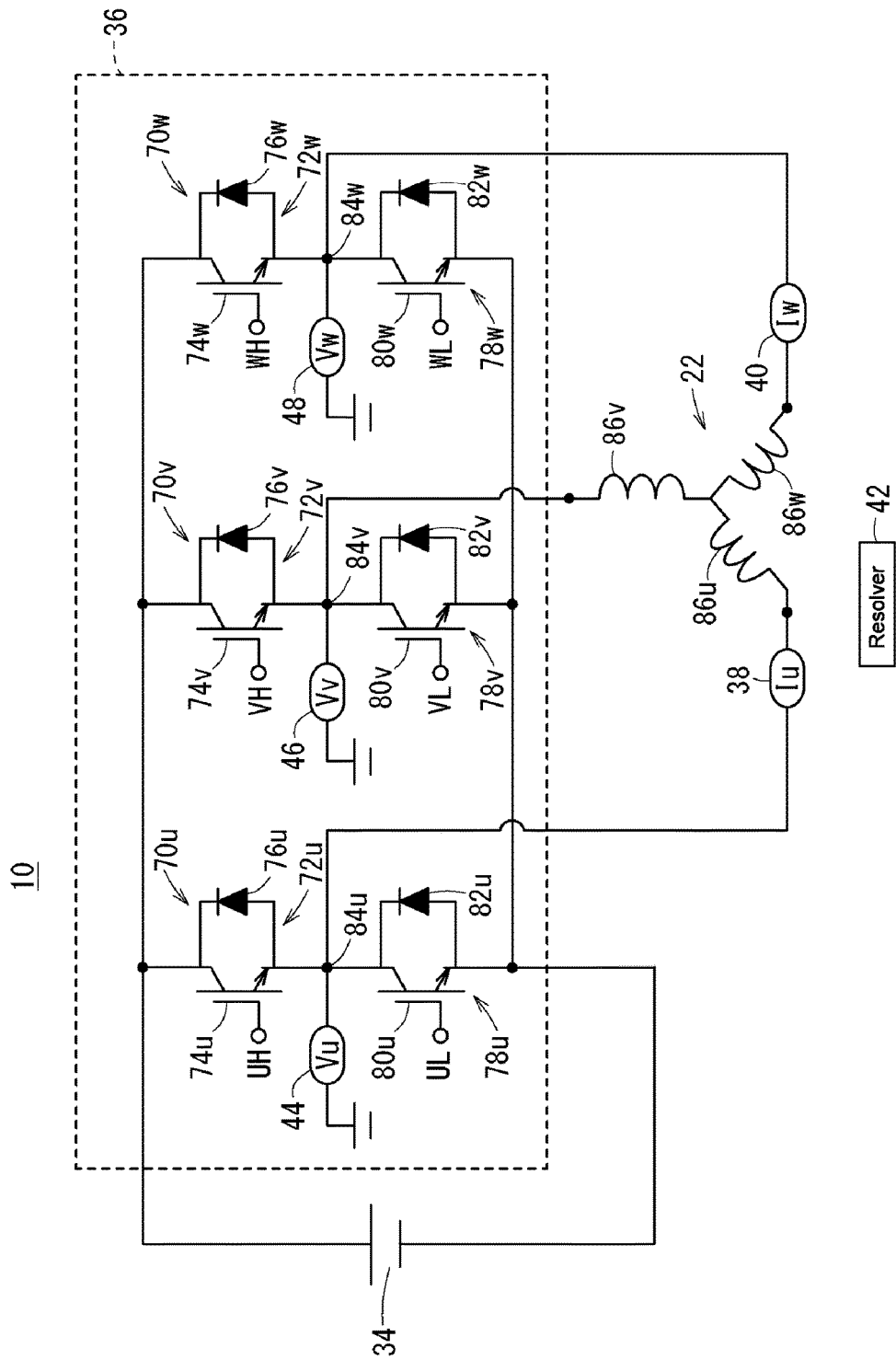
FIG. 2 is a circuit configuration diagram regarding a part of the electric power steering device.

FIG. 1 is a schematic configuration diagram of an electric power steering device 10 (hereinafter also referred to as "power steering device 10") according to one embodiment of the invention. FIG. 2 is a circuit configuration diagram regarding a part of the power steering device 10.

As shown in FIG. 1, the power steering device 10 has a steering handle (steering wheel) 12, a steering shaft 14, a rack shaft 16, a tie rod 18, and left and right front wheels 20 as steered wheels. The steering shaft 14, the rack shaft 16 and the tie rod 18 constitute a manual steering system directly transmitting a driver's steering operation on the steering handle 12 to the front wheels 20.

In addition, as shown in FIG. 1 and FIG. 2, the power steering device 10 has a motor 22, a worm gear 24, a worm wheel gear 26, a torque sensor 28, a vehicle speed sensor 30, a steering angle sensor 32, a battery 34, an inverter 36, current sensors 38 and 40, a resolver 42, voltage sensors 44, 46 and 48, and a drive control device 50 (hereinafter "ECU 50"). The motor 22, the worm gear 24 and the worm wheel gear 26 constitute an assist drive system generating a force (steering assist force) that assists the driver's steering. In addition, the torque sensor 28, the vehicle speed sensor 30, the steering angle sensor 32, the inverter 36, the current sensors 38 and 40, the resolver 42, the voltage sensors 44, 46 and 48, and the ECU 50 constitute an assist control system controlling the assist drive system. Hereinafter, the assist drive system, the assist control system and the battery 34 are also collectively referred to as a steering assist system.

2. Manual Steering System

The steering shaft 14 includes a main steering shaft 52 joined integrally to the steering handle 12, a pinion shaft 54 on which a pinion 56 of a rack and pinion mechanism is provided, and a universal joint 58 coupling the main steering shaft 52 and the pinion shaft 54.

Upper, intermediate and lower portions of the pinion shaft 54 are supported respectively by bearings 60a, 60b and 60c, and the pinion 56 is provided on a lower end portion of the pinion shaft 54. The pinion 56 is meshed with rack teeth 62 of the rack shaft 16 that is reciprocally movable in a vehicle width direction.

Accordingly, a steering torque Tr (rotational force) generated by the driver's operation on the steering handle 12 is transmitted to the pinion shaft 54 through the main steering shaft 52 and the universal joint 58. Then, the steering torque Tr is converted into a thrust by the pinion 56 of the pinion shaft 54 and the rack teeth 62 of the rack shaft 16, and the rack shaft 16 is displaced in the vehicle width direction. By tie rod 18 steering the front wheels 20 with the displacement of the rack shaft 16, the direction of the vehicle can be changed.

3. Steering Assist System (1) Assist Drive System

The motor 22 is coupled to the rack shaft 16 through the worm gear 24 and the worm wheel gear 26. That is, an output shaft 22a of the motor 22 is coupled to the worm gear 24. In addition, the worm wheel gear 26 meshed with the worm gear 24 is formed on the pinion shaft 54, and the pinion shaft 54 is coupled to the rack shaft 16.

The motor 22 is of a three-phase AC brushless type, and power is supplied thereto from the battery 34 through the inverter 36 controlled by the ECU 50. Then, the motor 22 generates a driving force (steering assist force) corresponding to the power. The driving force is transmitted to the rack shaft 16 through the output shaft 22a, the worm gear 24 and the pinion shaft 54 (the worm wheel gear 26 and the pinion 56). Accordingly, the driver's steering is assisted.

(2) Assist Control System (a) Feed-forward Sensors

The torque sensor 28 is provided between the bearing 60b of the intermediate portion of the pinion shaft 54 and the bearing 60a of the upper portion of the pinion shaft 54, detects the steering torque Tr based on a change in magnetic properties due to magnetostriction, and outputs the steering torque Tr to the ECU 50.

The vehicle speed sensor 30 detects a vehicle speed V [km/h] and outputs the vehicle speed to the ECU 50. The steering angle sensor 32 detects a steering angle θs [degree] of the steering handle 12 and outputs the steering angle to the ECU 50.

The steering torque Tr, the vehicle speed V and the steering angle θs are used in the ECU 50 for feed-forward control.

(b) Inverter 36

The inverter 36 is configured as a three-phase full bridge type, performs direct current/alternating current (DC/AC) conversion, converts a DC current from the battery 34 into a three-phase AC current and supplies the current to the motor 22.

As shown in FIG. 2, the inverter 36 has phase arms 70u, 70v and 70w of three phases. The U-phase arm 70u is composed of an upper arm element 72u having an upper switching element 74u (hereinafter "upper SW element 74u") and a diode 76u, and a lower arm element 78u having a lower switching element 80u (hereinafter "lower SW element 80u") and a diode 82u.

Similarly, the V-phase arm 70v is composed of an upper arm element 72v having an upper switching element 74v (hereinafter "upper SW element 74v") and a diode 76v, and a lower arm element 78v having a lower switching element 80v (hereinafter "lower SW element 80v") and a diode 82v. The W-phase arm 70w is composed of an upper arm element 72w having an upper switching element 74w (hereinafter "upper SW element 74w") and a diode 76w, and a lower arm element 78w having a lower switching element 80w (hereinafter "lower SW element 80w") and a diode 82w.

The upper SW elements 74u, 74v, 74w and the lower SW elements 80u, 80v, 80w adopt, for example, a metal-oxide-semiconductor field-effect transistor (MOSFET) or an insulated-gate bipolar transistor (IGBT).

Moreover, in the following, the phase arms 70u, 70v, 70w are generically referred to as phase arms 70, the upper arm elements 72u, 72v, 72w as upper arm elements 72, the lower arm elements 78u, 78v, 78w as lower arm elements 78, the upper SW elements 74u, 74v, 74w as upper SW elements 74, and the lower SW elements 80u, 80v, 80w as lower SW elements 80.

In each phase arm 70, midpoints 84u, 84v and 84w between the upper arm elements 72 and the lower arm elements 78 are connected to windings 86u, 86v and 86w of the motor 22. Hereinafter, the windings 86u, 86v and 86w are generically referred to as windings 86.

The upper SW elements 74 and the lower SW elements 80 are driven by drive signals UH, VH, WH, UL, VL and WL from the ECU 50.

(c) Feedback Sensors

The current sensor 38 detects a U-phase current (U-phase current Iu) at the winding 86u of the motor 22, and outputs the current to the ECU 50. Similarly, the current sensor 40 detects a W-phase current (W-phase current Iw) at the winding 86w, and outputs the current to the ECU 50. Moreover, if the current sensors 38 and 40 detect currents in two of the three phases of the motor 22, the current sensors 38 and 40 may detect currents in a combination of phases other than the combination of U phase and W phase.

The resolver 42 detects an electrical angle θ being a rotation angle of an output shaft (not illustrated) or an outer rotor (not illustrated) of the motor 22.

The voltage sensor 44 detects a voltage (hereinafter "U-phase voltage Vu") at the midpoint 84u of the U-phase arm 70u, and outputs the voltage to the ECU 50. The voltage sensor 46 detects a voltage (hereinafter "V-phase voltage Vv") at the midpoint 84v of the V-phase arm 70v, and outputs the voltage to the ECU 50. The voltage sensor 48 detects a voltage (hereinafter "W-phase voltage Vw") at the midpoint 84w of the W-phase arm 70w, and outputs the voltage to the ECU 50.

(d) ECU 50

Figure 3:
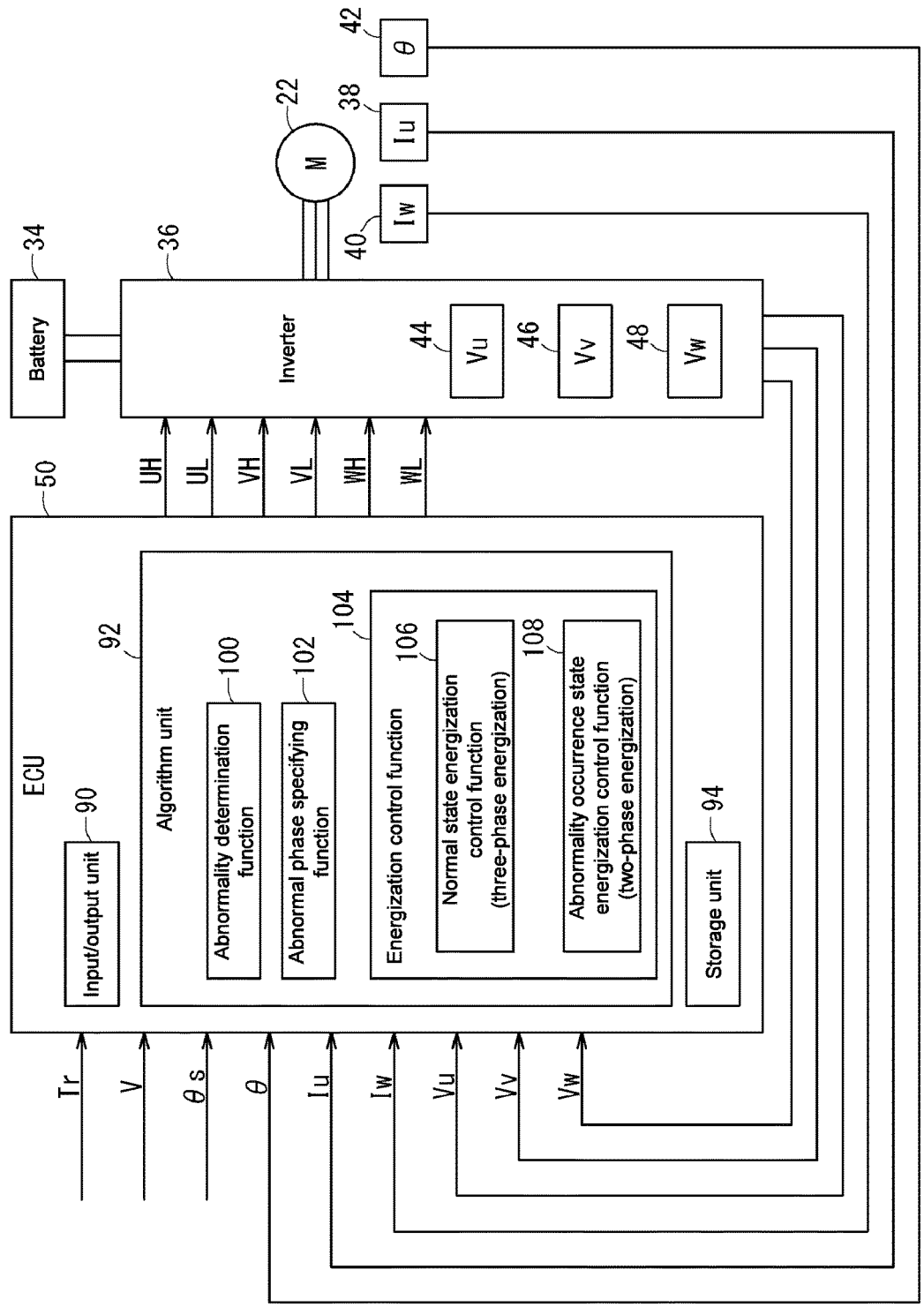
FIG. 3 illustrates input and output to and from a drive control device (electronic control unit, ECU) as well as an internal configuration and functions of the ECU.

FIG. 3 shows input and output to and from the ECU 50 as well as an internal configuration and functions of the ECU 50. The ECU 50 controls the output of the motor 22 based on an output value from each sensor.

As shown in FIG. 1 and FIG. 3, the ECU 50 has, as a hardware configuration, an input/output unit 90, a algorithm unit 92 and a storage unit 94. As shown in FIG. 3, the algorithm unit 92 of the ECU 50 has an abnormality determination function 100, an abnormal phase specifying function 102 and an energization control function 104. Among them, the energization control function 104 further includes a normal state energization control function 106 and an abnormality occurrence state energization control function 108. These functions are implemented by executing a program stored in the storage unit 94 (details thereof are described later).

(3) Battery 34

The battery 34 is a power storage device capable of outputting a low voltage (12 volts in the present embodiment), and can be, for example, a secondary battery such as a lead storage battery.

B. Process and Functions of ECU 50

1. Overall Flow

Figure 4:
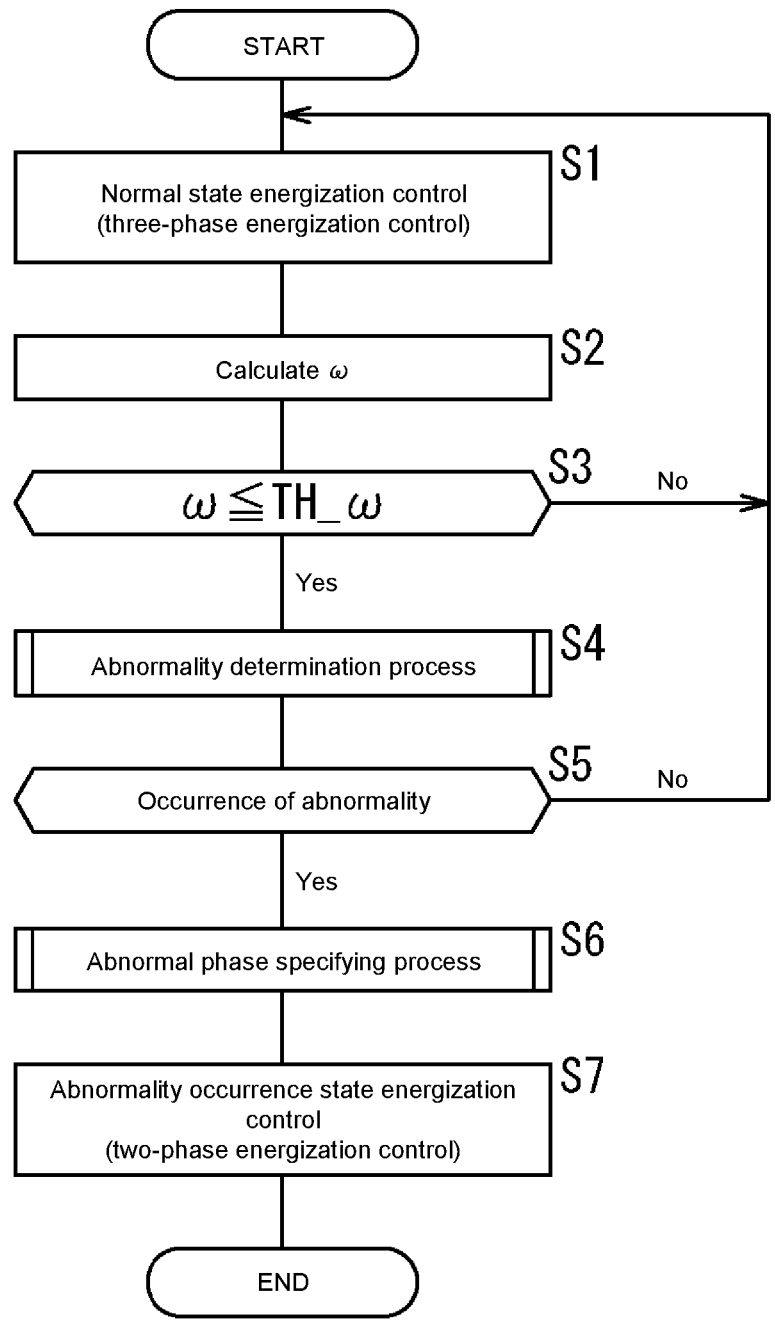
FIG. 4 is a flowchart showing an entire process of the ECU in the present embodiment.

FIG. 4 is a flowchart showing an entire process of the ECU 50 in the present embodiment. In step S1, the ECU 50 executes normal state energization control using the normal state energization control function 106. In the normal state energization control, the output of the motor 22 is controlled using the three phase arms 70 (see FIG. 2) of the inverter 36 (details thereof are described later).

In step S2, the ECU 50 calculates a rotational speed ω [degree/sec] of the motor 22 based on the electrical angle θ from the resolver 42.

In step S3, the ECU 50 determines whether or not the rotational speed ω calculated in step S2 is equal to or lower than a threshold TH_ω. The threshold TH_ω is a threshold for determining whether or not to perform an abnormality determination process in step S4. More specifically, the threshold TH_ω is a threshold for determining whether or not the motor 22 generates an excessive counter-electromotive force which makes accuracy of the abnormality determination process become insufficient, and is stored in the storage unit 94.

If the rotational speed ω is neither equal to nor lower than the threshold TH_ω (S3: NO), the ECU 50 returns to step S1. If the rotational speed ω is equal to or lower than the threshold TH_ω (S3: YES), in step S4, the ECU 50 executes the abnormality determination process using the abnormality determination function 100. If the result of the abnormality determination process in step S4 shows that no abnormality is occurring (S5: NO), the ECU 50 returns to step S1.

If the result of the abnormality determination process in step S4 shows that an abnormality is occurring (S5: YES), in step S6, the ECU 50 executes an abnormal phase specifying process. Then, the ECU 50 executes abnormality occurrence state energization control in step S7 based on the result of the abnormal phase specifying process (details thereof are described later).

2. Normal State Energization Control (Normal State Energization Control Function 106)

Figure 5:
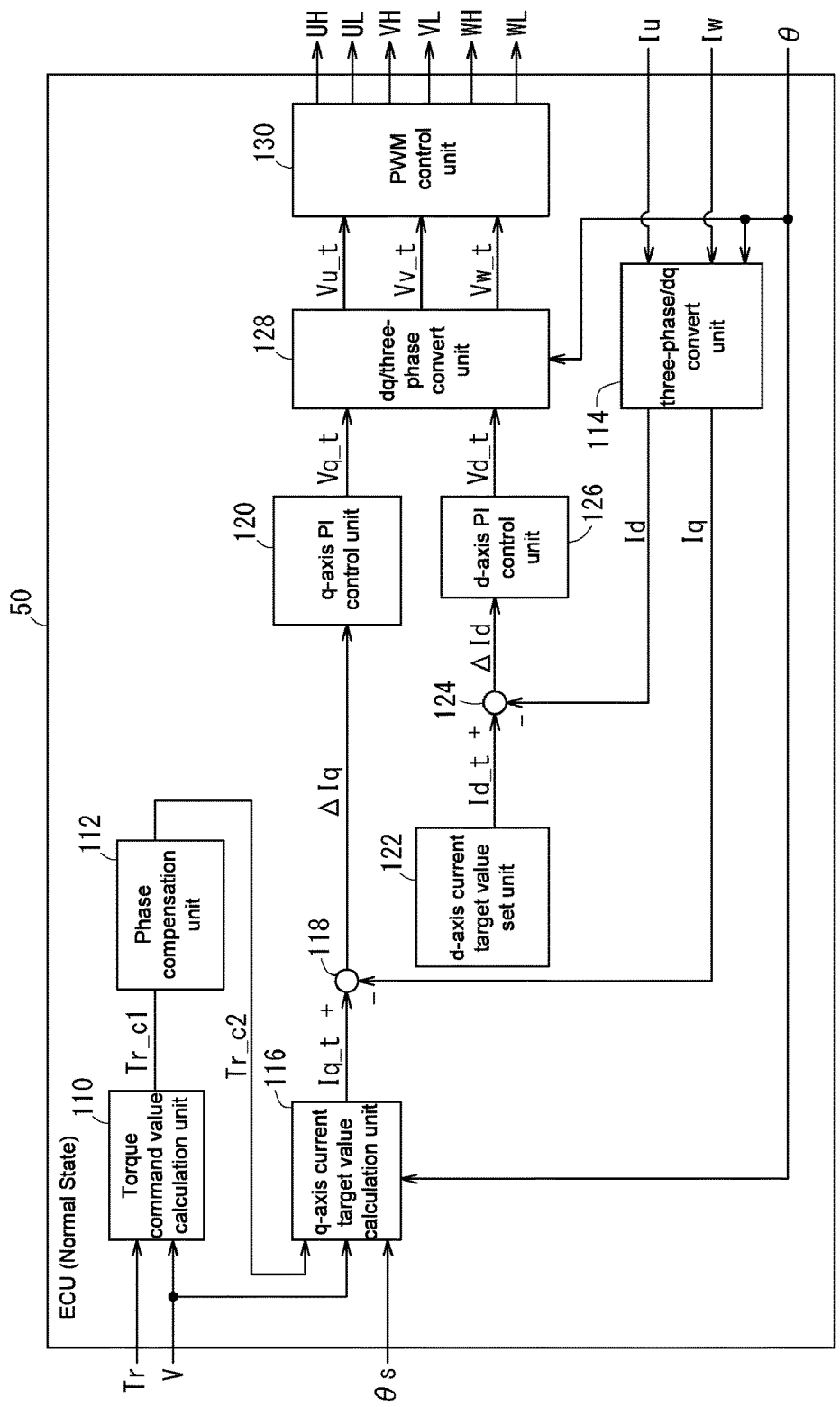
FIG. 5 is a functional block diagram of the ECU in normal state energization control.

FIG. 5 is a functional block diagram of the ECU 50 in the normal state energization control. As shown in FIG. 5, the ECU 50 in the normal state energization control has a torque command value calculation unit 110, a phase compensation unit 112, a three-phase/dq convert unit 114, a q-axis current target value calculation unit 116, a first subtracter 118, a q-axis proportional-integral (PI) control unit 120, a d-axis current target value set unit 122, a second subtracter 124, a d-axis PI control unit 126, a dq/three-phase convert unit 128, and a pulse-width modulation (PWM) control unit 130. The control of the inverter 36 is performed using these components. Moreover, as a control system of the inverter 36, basically, one disclosed in JP 2009-090817 or JP 2006-256542 can be used, and the components omitted in the present embodiment are additionally applicable.

Based on the steering torque Tr from the torque sensor 28 and the vehicle speed V from the vehicle speed sensor 30, the torque command value calculation unit 110 calculates a first torque command value Tr_c1. The phase compensation unit 112 performs a phase compensation process on the first torque command value Tr_c1 to calculate a second torque command value Tr_c2.

The three-phase/dq convert unit 114 performs three-phase/dq conversion using the U-phase current Iu from the current sensor 38, the W-phase current Iw from the current sensor 40 and the electrical angle θ from the resolver 42 to calculate a d-axis current Id as a current component (field current component) in a d-axis direction and a q-axis current Iq as a current component (torque current component) in a q-axis direction. Then, the three-phase/dq convert unit 114 outputs the q-axis current Iq to the first subtracter 118 and outputs the d-axis current Id to the second subtracter 124.

Moreover, the three-phase/dq conversion is a process for converting a set of the U-phase current Iu, the W-phase current Iw, and a V-phase current Iv (=–Iu-Iw) obtained from the U-phase current Iu and the W-phase current Iw, into a set of the d-axis current Id and the q-axis current Iq, by a conversion matrix corresponding to the electrical angle θ.

Based on the second torque command value Tr_c2 from the phase compensation unit 112, the vehicle speed V from the vehicle speed sensor 30, the steering angle θs from the steering angle sensor 32, and the electrical angle θ from the resolver 42, the q-axis current target value calculation unit 116 calculates a q-axis current target value Iq_t being a target value of the q-axis current Iq. The q-axis current target value calculation unit 116 calculates the q-axis current target value Iq_t by, for example, combining reference assist control, inertia control and damper control. The reference assist control, the inertia control and the damper control can be those described in, for example, JP 2009-090817, JP 2006-256542 or JP 2009-214711. The q-axis current target value Iq_t has a meaning as a feed-forward command value of the d-axis current and the q-axis current for causing the output shaft 22a of the motor 22 to generate torque corresponding to the second torque command value Tr_c2.

The first subtracter 118 calculates a deviation (=Iq_t-Iq) (hereinafter "q-axis current deviation ΔIq") between the q-axis current target value Iq_t and the q-axis current Iq, and outputs the deviation to the q-axis PI control unit 120. The q-axis PI control unit 120 calculates a q-axis voltage target value Vq_t being a target value of q-axis voltage by PI control (proportional-integral control) as feedback control, and outputs the q-axis voltage target value Vq_t to the dq/three-phase convert unit 128, so as to reduce the q-axis current deviation ΔIq to zero.

The d-axis current target value set unit 122 sets a target value (hereinafter "d-axis current target value Id_t") of the d-axis current Id required for changing the windings 86 of the motor 22 into magnets, and outputs the value to the second subtracter 124.

The second subtracter 124 calculates a deviation (=Id_t-Id) (hereinafter "d-axis current deviation ΔId") between the d-axis current target value Id_t and the d-axis current Id, and outputs the deviation to the d-axis PI control unit 126. The d-axis PI control unit 126 calculates a d-axis voltage target value Vd_t being a target value of d-axis voltage by PI control (proportional-integral control) as feedback control, and outputs the d-axis voltage target value Vd_t to the dq/three-phase convert unit 128, so as to reduce the d-axis current deviation ΔId to zero.

The dq/three-phase convert unit 128 performs dq/three-phase conversion using the q-axis voltage target value Vq_t from the q-axis PI control unit 120, the d-axis voltage target value Vd_t from the d-axis PI control unit 126, and the electrical angle θ from the resolver 42, calculates phase voltage target values Vu_t, Vv_t and Vw_t of U phase, V phase and W phase, and outputs the phase voltage target values Vu_t, Vv_t and Vw_t to the PWM control unit 130. Moreover, the dq/three-phase conversion is a process for converting a set of the d-axis voltage target value Vd_t and the q-axis voltage target value Vq_t into a set of the phase voltage target values Vu_t, Vv_t and Vw_t by a conversion matrix corresponding to the electrical angle θ.

According to the phase voltage target values Vu_t, Vv_t and Vw_t, the PWM control unit 130 energizes the windings 86 of each phase of the motor 22 by pulse-width modulation (PWM) control through the inverter 36. The PWM control unit 130 energizes the windings 86 of each phase by controlling on and off of the upper SW elements 74 and the lower SW elements 80 of the inverter 36.

More specifically, the PWM control unit 130 generates the drive signals UH, UL, VH, VL, WH and WL for the phase arms 70 in each switching period. Herein, if a duty value DUT in one entire switching period is 100%, then a duty value DUT2 for the lower SW elements 80 is calculated by subtracting a duty value DUT1 for the upper SW elements 74 from 100%. Furthermore, the drive signals UH, UL, VH, VL, WH and WL that are actually outputted are obtained by reflecting a dead time dt in the duty values DUT1 and DUT2 respectively for the upper SW elements 74 and the lower SW elements 80.

Figure 6:
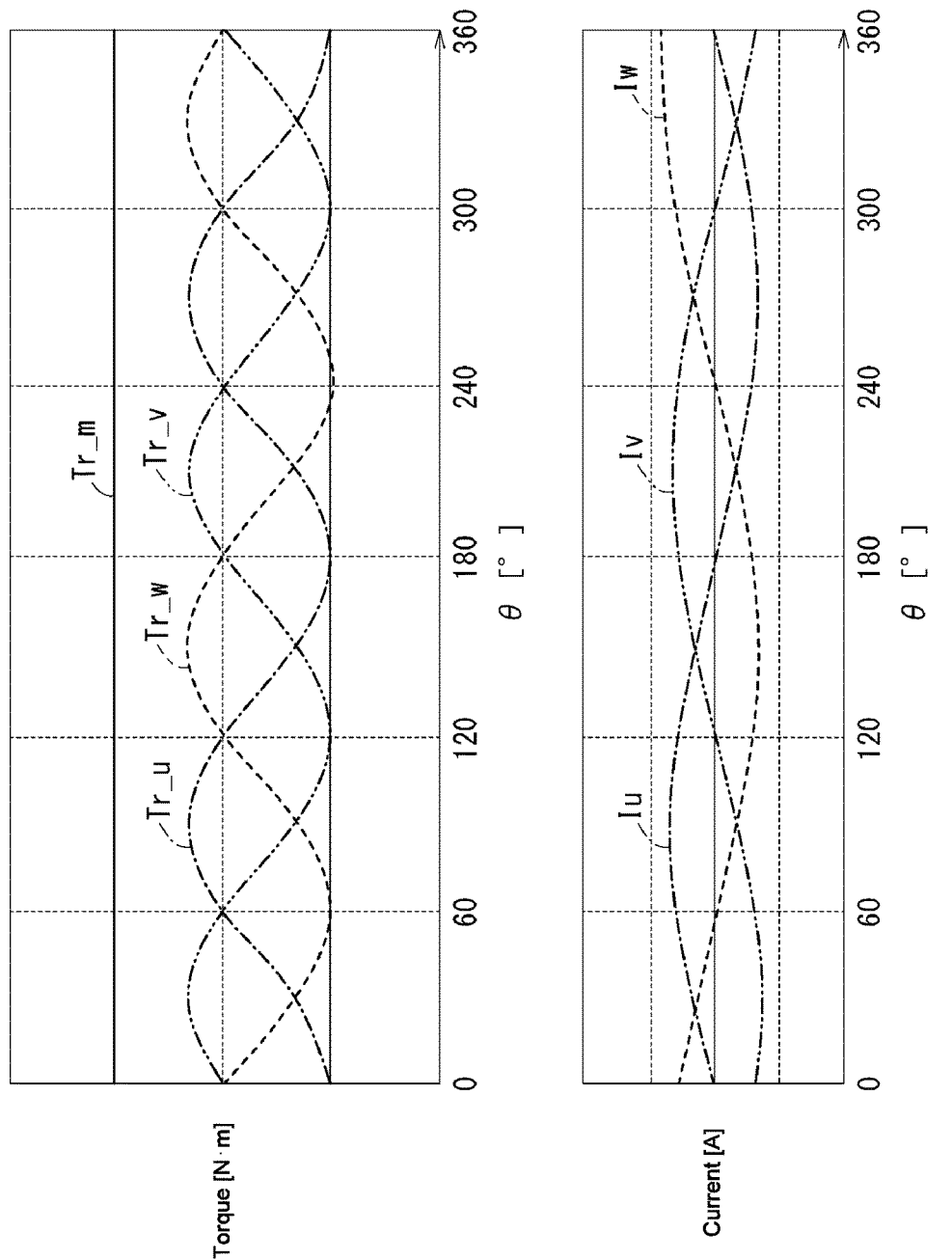
FIG. 6 illustrates an example of waveforms of torque of each phase, steering assist torque, and currents of each phase in the normal state energization control.

When the normal state energization control as described above is used, as torque (hereinafter "U-phase torque Tr_u," "V-phase torque Tr_v," and "W-phase torque Tr_w") generated in each phase, torque (hereinafter "motor torque Tr_m") outputted by the motor 22 as the sum of the U-phase torque Tr_u, the V-phase torque Tr_v and the W-phase torque Tr_w, and currents (hereinafter "U-phase current Iu," "V-phase current Iv," and "W-phase current Iw") in each phase in the normal state energization control, waveforms shown in FIG. 6, for example, can be obtained.

3. Abnormality Determination Process (Abnormality Determination Function 100)

Figure 7:
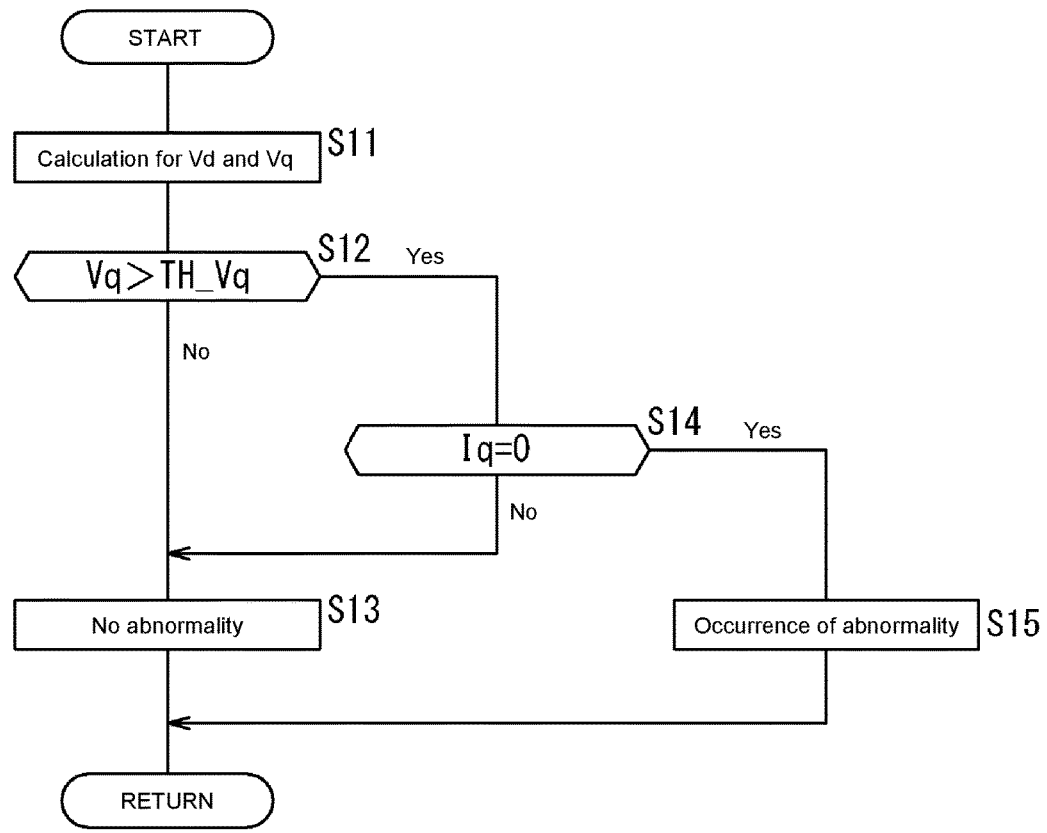
FIG. 7 is a flowchart of an abnormality determination process performed by the ECU.

FIG. 7 is a flowchart (details of S4 in FIG. 4) of the abnormality determination process (the abnormality determination function 100) performed by the ECU 50. In step S11, the ECU 50 obtains a d-axis voltage Vd and a q-axis voltage Vq by calculation. Specifically, the ECU 50 obtains the d-axis voltage Vd and the q-axis voltage Vq by subjecting the U-phase voltage Vu from the voltage sensor 44, the V-phase voltage Vv from the voltage sensor 46 and the W-phase voltage Vw from the voltage sensor 48 to three-phase/dq conversion using the electrical angle θ.

In step S12, the ECU 50 determines whether or not the q-axis voltage Vq obtained in step S11 exceeds a threshold TH_Vq. The threshold TH_Vq is a threshold for determining whether or not the q-axis voltage Vq has been outputted.

If the q-axis voltage Vq does not exceed the threshold TH_Vq (S12: NO), in step S13, the ECU 50 determines that no abnormality is occurring, and returns to the process in FIG. 4. If the q-axis voltage Vq exceeds the threshold TH_Vq (S12: YES), the ECU 50 proceeds to step S14.

In step S14, the ECU 50 determines whether or not the q-axis current Iq is zero. Accordingly, whether or not the q-axis current Iq has been generated can be determined. Instead of performing the above determination, presence or absence of generation of the q-axis current Iq corresponding to the q-axis voltage Vq can also be determined by providing a positive threshold for an absolute value of the q-axis current Iq and determining whether or not the q-axis current Iq is equal to or less than the threshold.

If the q-axis current Iq is not zero (S14: NO), the ECU 50 proceeds to step S13. If the q-axis current Iq is zero (S14: YES), although the q-axis voltage Vq has been outputted, the q-axis current Iq is not flowing. In this case, it can be said that an abnormality (for example, disconnection of a power line or a signal line from the PWM control unit 130 to the SW elements 74 and 80) that no current is generated is occurring in any phase (phase arm 70). Therefore, in step S15, the ECU 50 specifies occurrence of an abnormality (at this point, the phase in which the abnormality is occurring has not been specified).

4. Abnormal Phase Specifying Process (Abnormal Phase Specifying Function 102)

Figure 8:
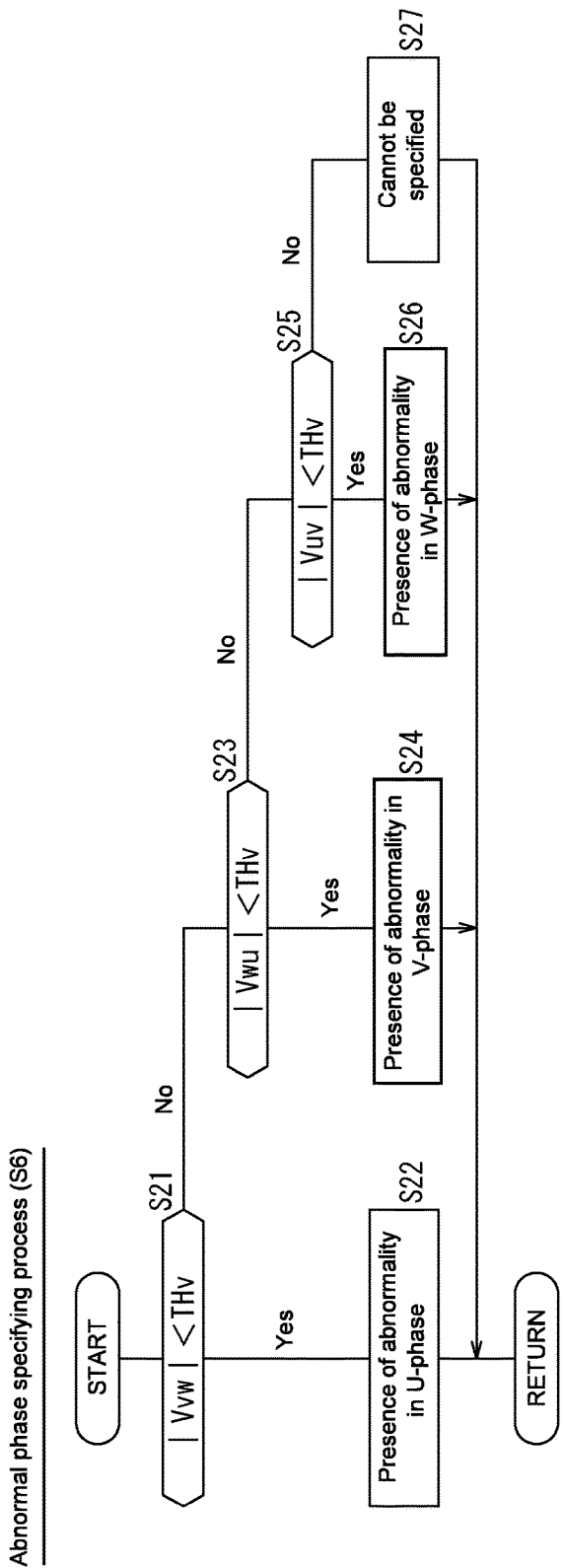
FIG. 8 is a flowchart of an abnormal phase specifying process performed by the ECU.

FIG. 8 is a flowchart (details of S6 in FIG. 4) of the abnormal phase specifying process (the abnormal phase specifying function 102) performed by the ECU 50. In step S21, the ECU 50 determines whether or not an absolute value of an inter-phase voltage (hereinafter "VW inter-phase voltage Vvw") between the V-phase voltage Vv from the voltage sensor 46 and the W-phase voltage Vw from the voltage sensor 48 is less than a threshold THv. The VW inter-phase voltage Vvw is defined as a difference between the V-phase voltage Vv and the W-phase voltage Vw (Vvw=Vv-Vw). The threshold THv is for determining whether or not the VW inter-phase voltage Vvw is zero or a value close thereto (in other words, whether or not the V-phase voltage Vv is substantially equal to the W-phase voltage Vw).

If the absolute value of the VW inter-phase voltage Vvw is less than the threshold THv (S21: YES), the VW inter-phase voltage Vvw is substantially zero, and it is known that the V phase and the W phase function normally. Hence, it is known that the abnormality such as disconnection or the like is occurring in the U phase. Therefore, in step S22, the ECU 50 specifies that the abnormality is occurring in the U phase. If the absolute value of the VW inter-phase voltage Vvw is not less than the threshold THv (S21: NO), the ECU 50 proceeds to step S23.

In step S23, the ECU 50 determines whether or not an absolute value of an inter-phase voltage (hereinafter "WU inter-phase voltage Vwu") between the W-phase voltage Vw from the voltage sensor 48 and the U-phase voltage Vu from the voltage sensor 44 is less than the threshold THv. The WU inter-phase voltage Vwu is defined as a difference between the W-phase voltage Vw and the U-phase voltage Vu (Vwu=Vw-Vu). Accordingly, whether or not the WU inter-phase voltage Vwu is zero or a value close thereto (in other words, whether or not the W-phase voltage Vw is substantially equal to the U-phase voltage Vu) can be determined.

If the absolute value of the WU inter-phase voltage Vwu is less than the threshold THv (S23: YES), the WU inter-phase voltage Vwu is substantially zero, and it is known that the W phase and the U phase function normally. Hence, it is known that the abnormality such as disconnection or the like is occurring in the V phase. Therefore, in step S24, the ECU 50 specifies that the abnormality is occurring in the V phase. If the absolute value of the WU inter-phase voltage Vwu is not less than the threshold THv (S23: NO), the ECU 50 proceeds to step S25.

In step S25, the ECU 50 determines whether or not an absolute value of an inter-phase voltage (hereinafter "UV inter-phase voltage Vuv") between the U-phase voltage Vu from the voltage sensor 44 and the V-phase voltage Vv from the voltage sensor 46 is less than the threshold THv. The UV inter-phase voltage Vuv is defined as a difference between the U-phase voltage Vu and the V-phase voltage Vv (Vuv=Vu-Vv). Accordingly, whether or not the UV inter-phase voltage Vuv is zero or a value close thereto (in other words, whether or not the U-phase voltage Vu is substantially equal to the V-phase voltage Vv) can be determined.

If the absolute value of the UV inter-phase voltage Vuv is less than the threshold THv (S25: YES), the UV inter-phase voltage Vuv is substantially zero, and it is known that the U phase and the V phase function normally. Hence, it is known that the abnormality such as disconnection or the like is occurring in the W phase. Therefore, in step S26, the ECU 50 specifies that the abnormality is occurring in the W phase. If the absolute value of the UV inter-phase voltage Vuv is not less than the threshold THv (S25: NO), the phase (abnormal phase) in which the abnormality is occurring cannot be specified. Such cases may be, for example, when the abnormality occur in two phases and currents do not flow. In this case, in step S27, the ECU 50 determines that the abnormal phase cannot be specified. Then, the motor 22 is stopped by a fail-safe function contained in the ECU 50.

5. Abnormality Occurrence State Energization Control (Abnormality Occurrence State Energization Control Function 108)

(1) General

Figure 9:
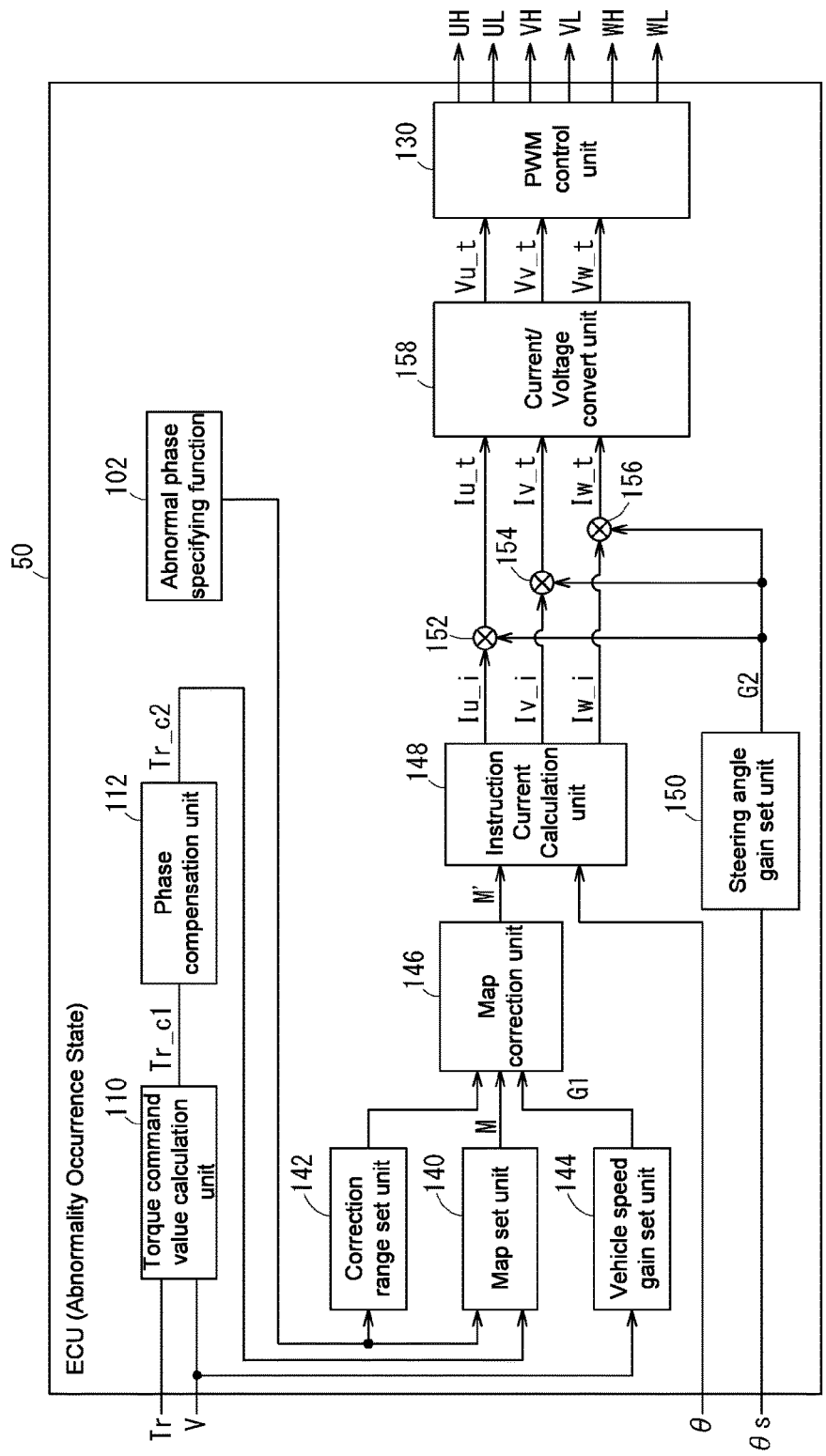
FIG. 9 is a functional block diagram of the ECU in abnormality occurrence state energization control.

FIG. 9 is a functional block diagram of the ECU 50 in the abnormality occurrence state energization control. In the following, the same components as those in FIG. 5 are denoted by the same reference numerals and explanations thereof are omitted.

As shown in FIG. 9, the ECU 50 in the abnormality occurrence state energization control has the torque command value calculation unit 110, the phase compensation unit 112, a map set unit 140, a correction range set unit 142, a vehicle speed gain set unit 144, a map correction unit 146, an instruction current calculation unit 148, a steering angle gain set unit 150, a first multiplier 152, a second multiplier 154, a third multiplier 156, a current/voltage convert unit 158 and the PWM control unit 130. The control of the inverter 36 (see FIG. 3) is performed using these components.

(2) Torque Command Value Calculation Unit 110 and Phase Compensation Unit 112

Similarly to the normal state energization control, based on the steering torque Tr from the torque sensor 28 and the vehicle speed V from the vehicle speed sensor 30, the torque command value calculation unit 110 calculates the first torque command value Tr_c1. The phase compensation unit 112 performs the phase compensation process on the first torque command value Tr_c1 to calculate the second torque command value Tr_c2.

(3) Map Set Unit 140

Based on the second torque command value Tr_c2 and a specified result (whether an abnormality is occurring in any phase) of the abnormal phase specifying function 102, the map set unit 140 selects, from among maps M stored in the storage unit 94, a map M to use.

Figure 10:
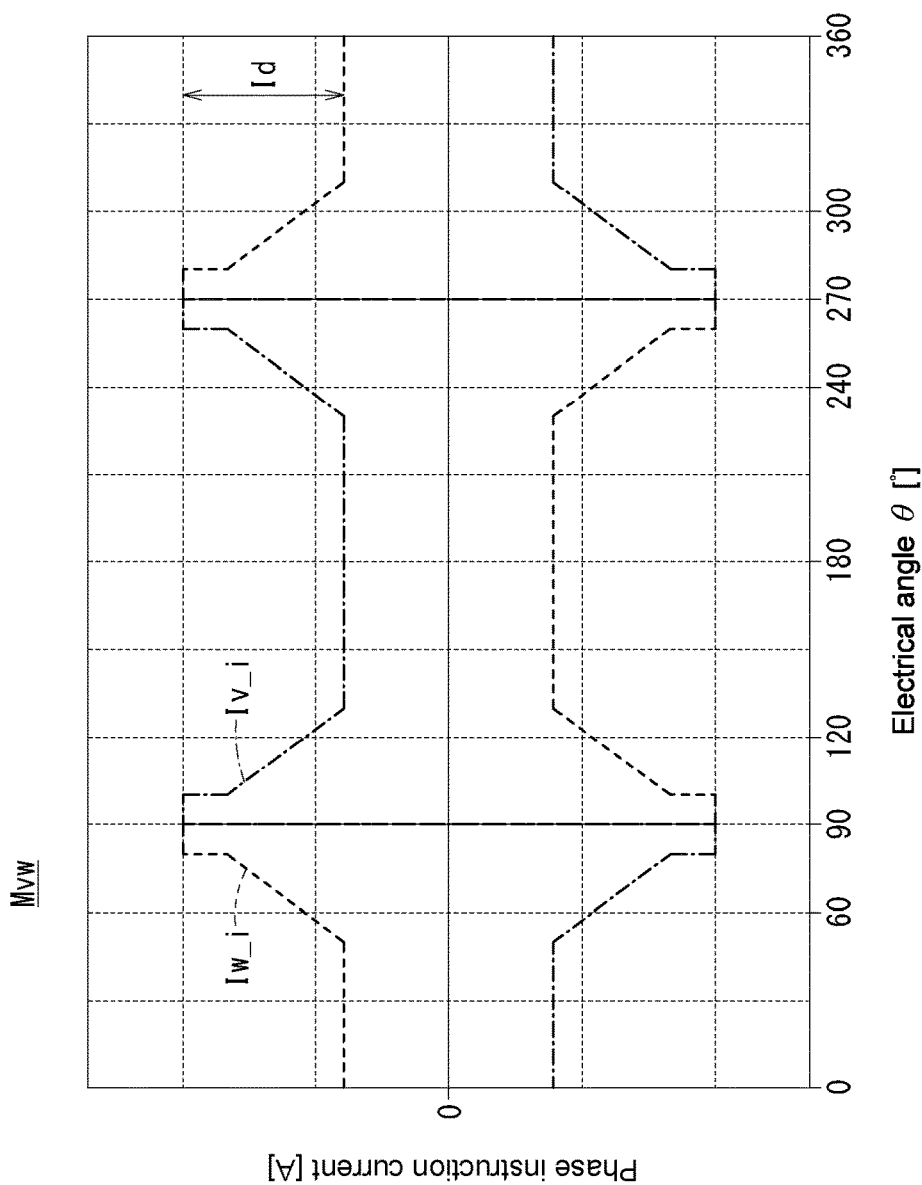
FIG. 10 is a map associating electrical angle with phase instruction current in cases where an abnormal phase is U phase.
Figure 11:
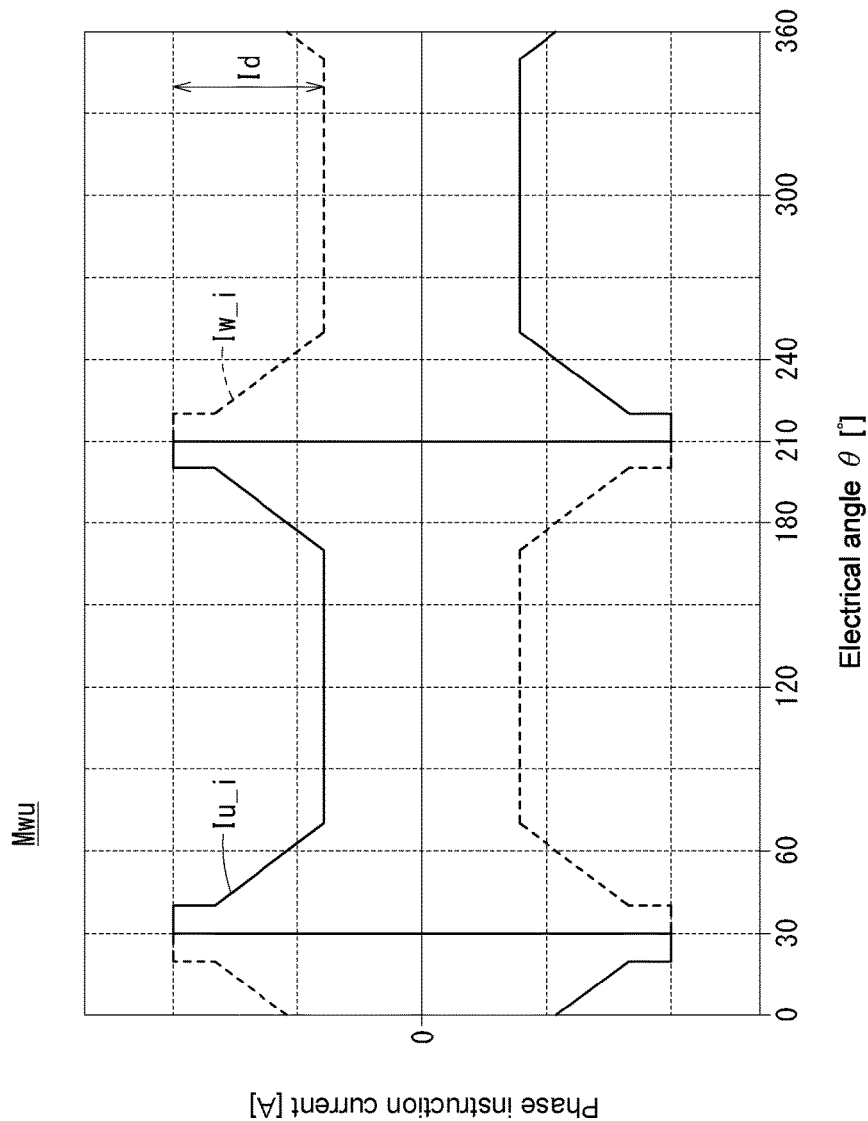
FIG. 11 is a map associating electrical angle with phase instruction current in cases where the abnormal phase is V phase.
Figure 12:
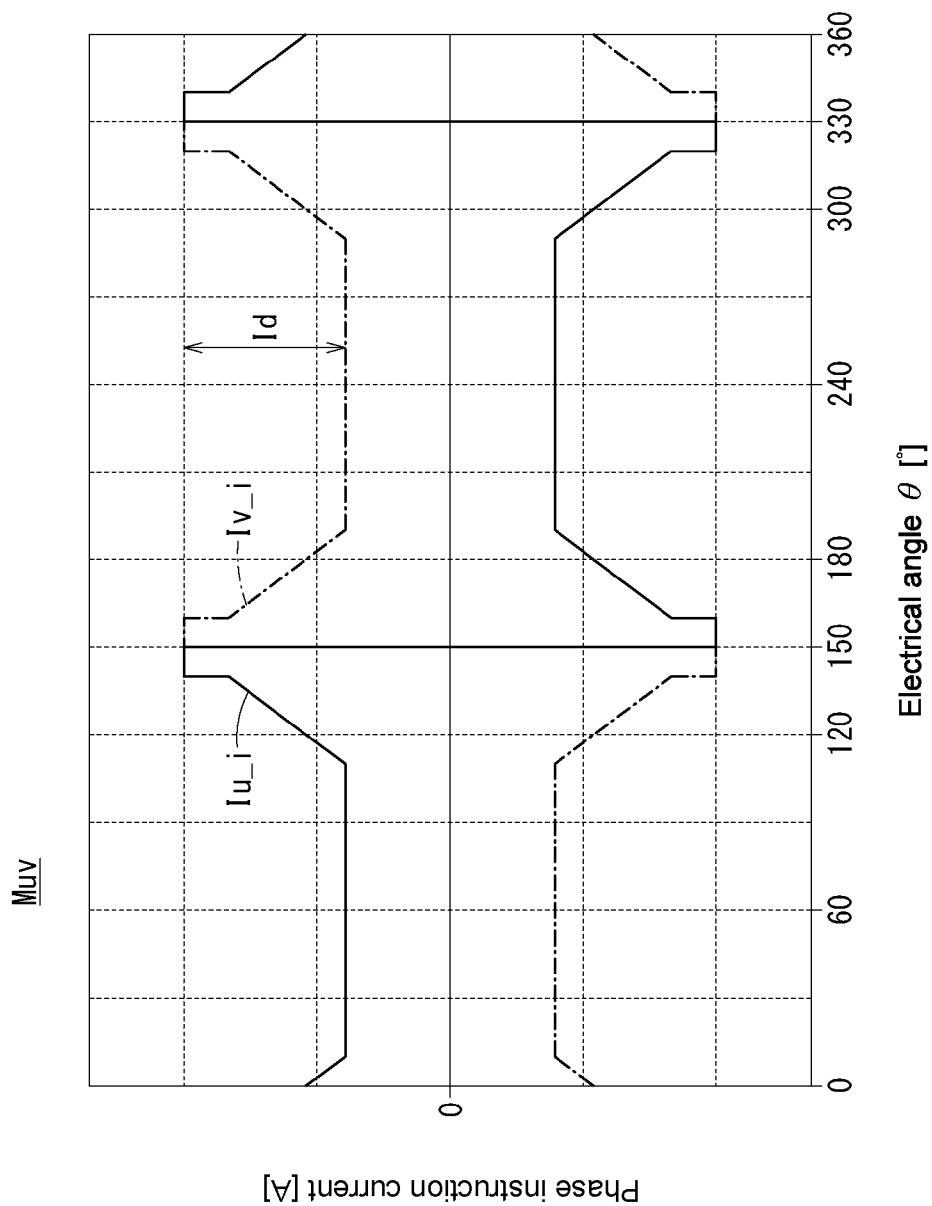
FIG. 12 is a map associating electrical angle with phase instruction current in cases where the abnormal phase is W phase.

The storage unit 94 (see FIG. 3) stores the map M to be used in the abnormality occurrence state energization control. Examples of the map M include a map Mvw (see FIG. 10) to be used in cases where the abnormal phase is U phase, a map Mwu (see FIG. 11) to be used in cases where the abnormal phase is V phase, and a map Muv (see FIG. 12) to be used in cases where the abnormal phase is W phase. As shown in FIG. 10 to FIG. 12, in each map M (Mvw, Mwu and Muv), an association between the electrical angle θ detected during the abnormality occurrence state energization control and phase instruction current values Iu_i, Iv_i and Iw_i to be instructed is set. Furthermore, the association between the electrical angle θ and the phase instruction current values Iu_i, Iv_i and Iw_i is set for each torque command value (herein, the second torque command value Tr_c2).

As shown in FIG. 10, in the map Mvw, the V-phase instruction current value Iv_i and the W-phase instruction current value Iw_i are set which become the maximum in a predetermined range (herein, ±10°) centered on the electrical angles θ of 90° and 270°. As shown in FIG. 11, in the map Mwu, the W-phase instruction current value Iw_i and the U-phase instruction current value Iu_i are set which become the maximum in a predetermined range (herein, ±10°) centered on the electrical angles θ of 30° and 210°. As shown in FIG. 12, in the map Muv, the U-phase instruction current value Iu_i and the V-phase instruction current value Iv_i are set which become the maximum in a predetermined range (herein, ±10°) centered on the electrical angles θ of 150° and 330°.

(4) Correction Range Set Unit 142

Based on the specified result (whether an abnormality is occurring in any phase) of the abnormal phase specifying function 102, the correction range set unit 142 sets a correction range of the map M (range of the electrical angle θ). The correction range is set according to the phase in which the abnormality occurs, i.e., the map M. For example, if the abnormal phase is U phase, in the map Mvw shown in FIG. 10, 0° to 80°, 100° to 260°, and 280° to 360°, in which the V-phase instruction current value Iv_i and the W-phase instruction current value Iw_i are not the maximum, are set as the correction range. If the abnormal phase is V phase, in the map Mwu shown in FIG. 11, 0° to 20°, 40° to 200°, and 220° to 360°, in which the W-phase instruction current value Iw_i and the U-phase instruction current value Iu_i are not the maximum, are set as the correction range. If the abnormal phase is W phase, in the map Muv shown in FIG. 12, 0° to 140°, 160° to 320°, and 340° to 360°, in which the U-phase instruction current value Iu_i and the V-phase instruction current value Iv_i are not the maximum, are set as the correction range.

(5) Vehicle Speed Gain Set Unit 144

Figure 13:
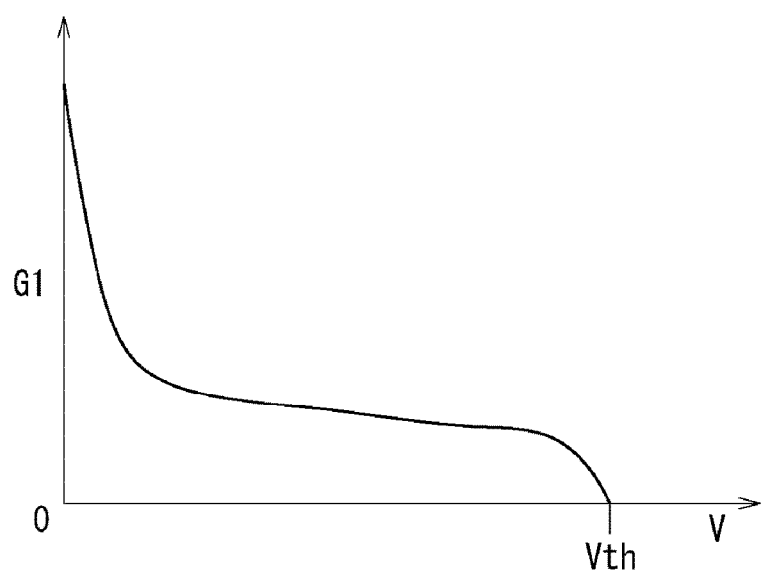
FIG. 13 illustrates a relationship between vehicle speed and gain.

The vehicle speed gain set unit 144 outputs a gain G1 corresponding to the vehicle speed V from the vehicle speed sensor 30. A relationship between the vehicle speed V and the gain G1 as shown in FIG. 13 is stored in the storage unit 94. As shown in FIG. 13, the gain G1 is reduced as the vehicle speed V increases, and the gain G1 is 0 at a predetermined vehicle speed Vth or higher. When 0 is outputted as the gain G1, the later-described map correction unit 146 causes the phase instruction current values Iu_i, Iv_i and Iw_i to become zero. Accordingly, energization is stopped, and steering assist is stopped.

(6) Map Correction Unit 146

The map correction unit 146 corrects the phase instruction current values Iu_i, Iv_i and Iw_i of the correction range set by the correction range set unit 142 in the map M selected by the map set unit 140 using the gain G1 outputted from the vehicle speed gain set unit 144. Specifically, the phase instruction current values Iu_i, Iv_i, Iw_i and the gain G1 are multiplied together. By correcting the phase instruction current values Iu_i, Iv_i and Iw_i using the gain G1, the phase instruction current values Iu_i, Iv_i and Iw_i corresponding to the vehicle speed V are obtained. On this occasion, as the vehicle speed V increases, the phase instruction current values Iu_i, Iv_i and Iw_i decrease.

Figure 14:
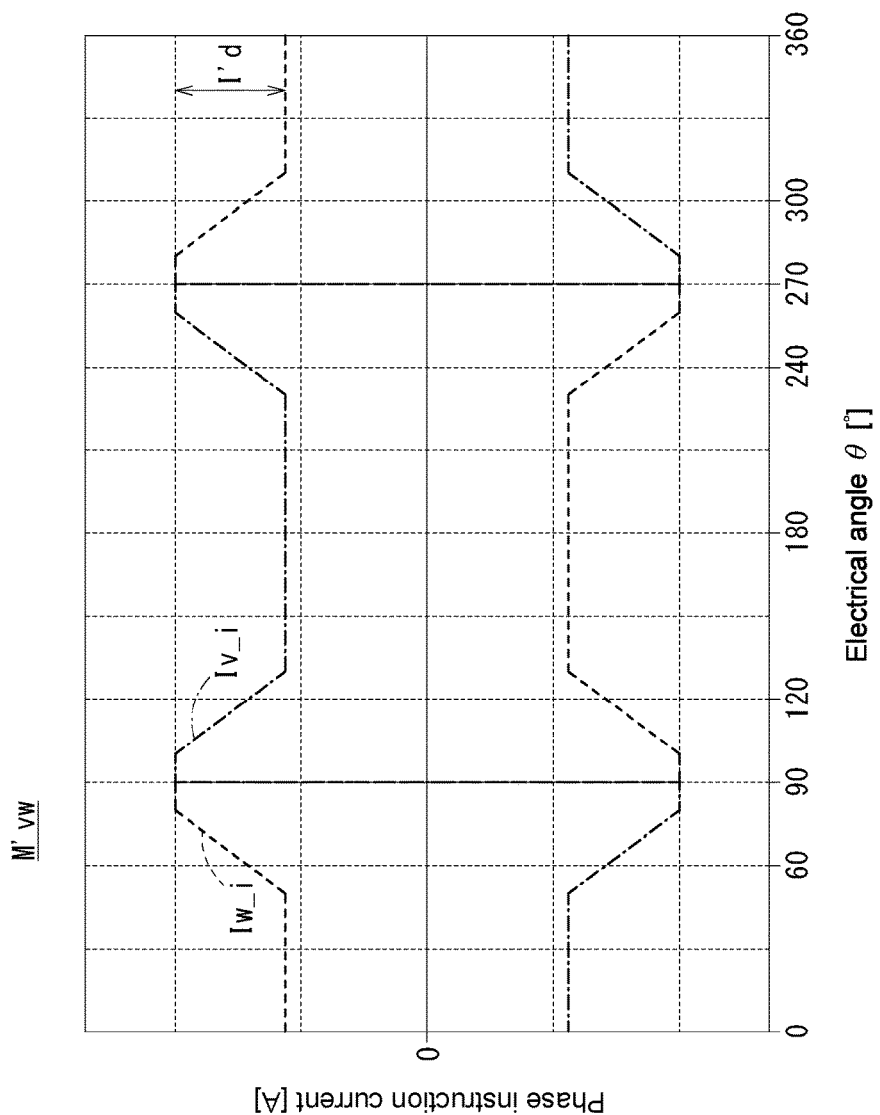
FIG. 14 is a map obtained by correcting the map shown in FIG. 10.
Figure 15:
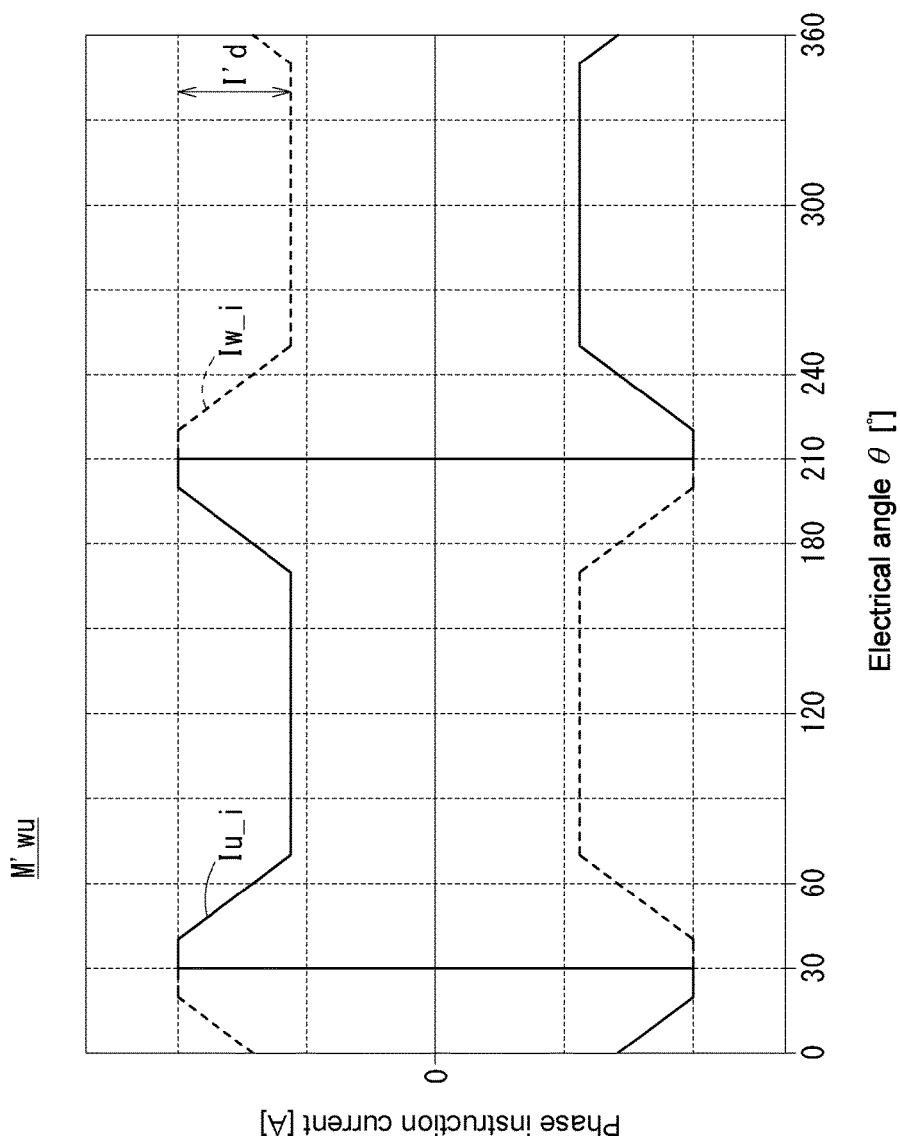
FIG. 15 is a map obtained by correcting the map shown in FIG. 11.
Figure 16:
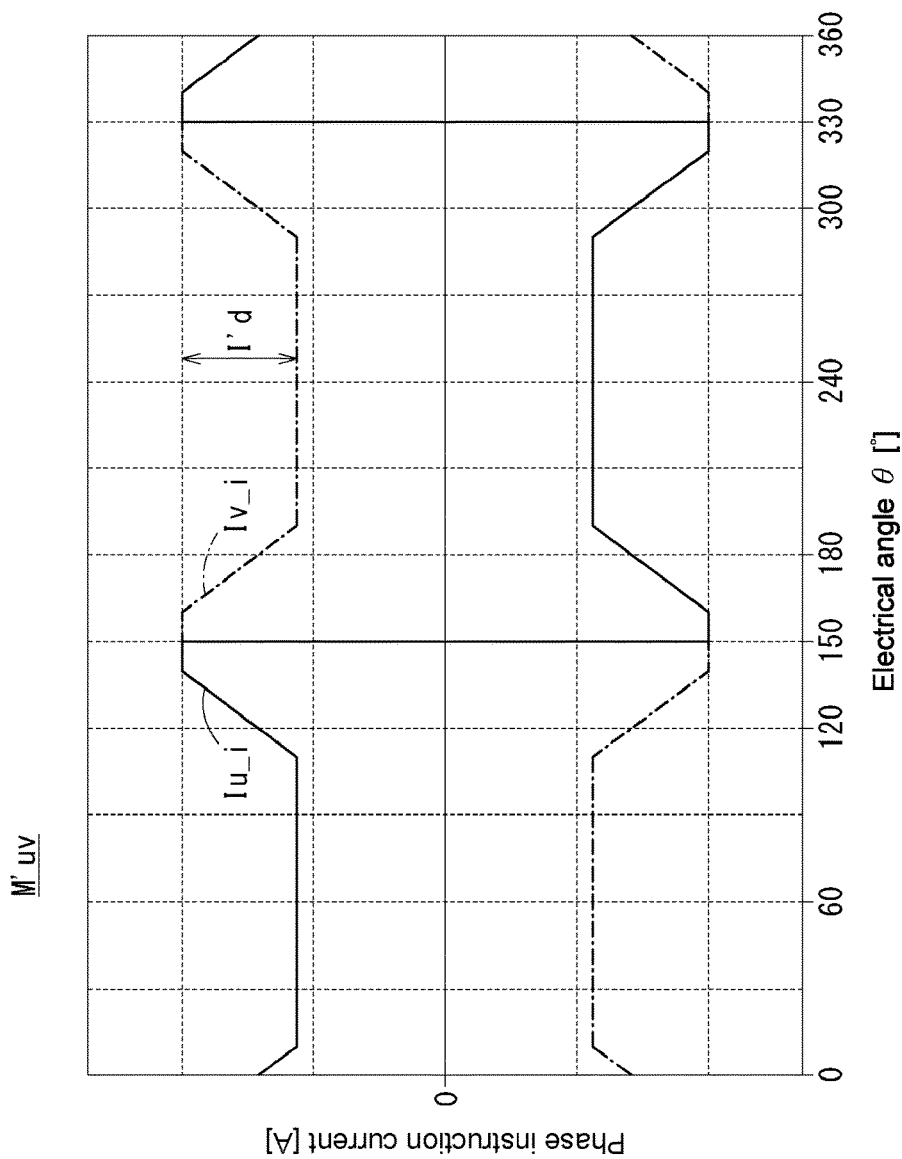
FIG. 16 is a map obtained by correcting the map shown in FIG. 12.

For example, when the map Mvw shown in FIG. 10 is corrected, a map M'vw shown in FIG. 14 is obtained. In the map M'vw, the V-phase instruction current value Iv_i and the W-phase instruction current value Iw_i at 0° to 80°, 100° to 260° and 280° to 360° are greater than they were prior to the correction. When the map Mwu shown in FIG. 11 is corrected, a map M'wu shown in FIG. 15 is obtained. In the map M'wu, the W-phase instruction current value Iw_i and the U-phase instruction current value Iu_i at 0° to 20°, 40° to 200° and 220° to 360° are greater than they were prior to the correction. When the map Muv shown in FIG. 12 is corrected, a map M'uv shown in FIG. 16 is obtained. In the map M'uv, the U-phase instruction current value Iu_i and the V-phase instruction current value Iv_i at 0° to 140°, 160° to 320° and 340° to 360° are greater than they were prior to the correction. When the maps M shown in FIG. 10 to FIG. 12 are compared with the maps M' shown in FIG. 14 to FIG. 16, a difference between the maximum and minimum values of the phase instruction current values Iu_i, Iv_i and Iw_i is smaller (I'd<Id) in the maps M' shown in FIG. 14 to FIG. 16.

(7) Instruction Current Calculation Unit 148

The instruction current calculation unit 148 uses the corrected map M' to obtain two of the phase instruction current values Iu_i, Iv_i and Iw_i of two phases corresponding to the electrical angle θ from the resolver 42. On this occasion, any of the phase instruction current values Iv_i and Iw_i of the abnormal phase is zero (energization is stopped).

(8) Steering Angle Gain Set Unit 150

Figure 17:
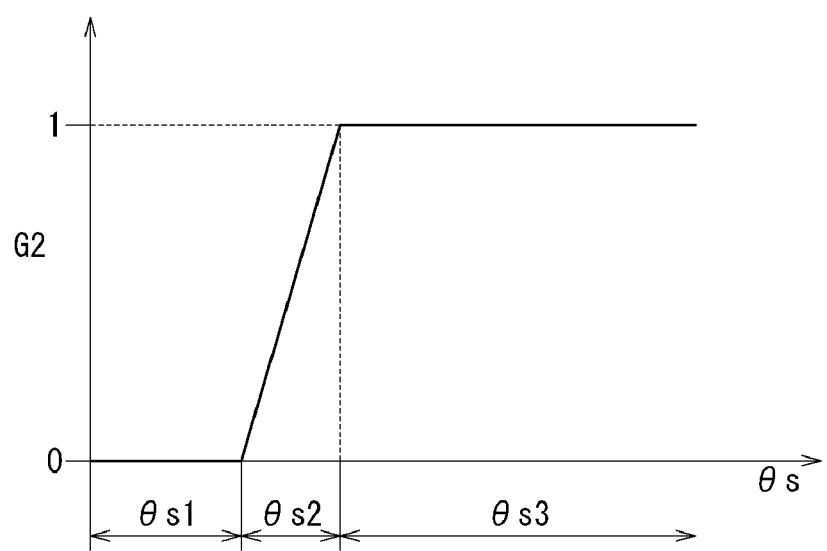
FIG. 17 illustrates a relationship between steering angle and gain.

The steering angle gain set unit 150 outputs a gain G2 corresponding to the steering angle θs from the steering angle sensor 32. A relationship between the steering angle θs and the gain G2 as shown in FIG. 17 is stored in the storage unit 94. As shown in FIG. 17, the gain G2 is 0 when the steering angle θs is within a first range θs1 including a steering angle neutral point (i.e., zero); the gain G2 is gradually increased with an increase in θs when the steering angle θs is within a second range θs2; and the gain G2 is 1 when the steering angle θs is within a third range θs3. Moreover, FIG. 17 shows absolute values of the steering angle θs.

(9) First Multiplier 152, Second Multiplier 154 and Third Multiplier 156

The first multiplier 152 multiplies the U-phase instruction current value Iu_i obtained by the instruction current calculation unit 148 and the gain G2 outputted from the steering angle gain set unit 150 together, and outputs the result as a U-phase target current value Iu_t. The second multiplier 154 multiplies the V-phase instruction current value Iv_i obtained by the instruction current calculation unit 148 and the gain G2 outputted from the steering angle gain set unit 150 together, and outputs the result as a V-phase target current value Iv_t. The third multiplier 156 multiplies the W-phase instruction current value Iw_i obtained by the instruction current calculation unit 148 and the gain G2 outputted from the steering angle gain set unit 150 together, and outputs the result as a W-phase target current value Iw_t.

(10) Current/Voltage Convert Unit 158

The current/voltage convert unit 158 converts the U-phase target current value Iu_t outputted from the first multiplier 152 into a voltage and outputs the voltage as the U-phase voltage target value Vu_t. In addition, the current/voltage convert unit 158 converts the V-phase target current value Iv_t outputted from the second multiplier 154 into a voltage and outputs the voltage as the V-phase voltage target value Vv_t. In addition, the current/voltage convert unit 158 converts the W-phase target current value Iw_t outputted from the third multiplier 156 into a voltage and outputs the voltage as the W-phase voltage target value Vw_t.

(11) PWM Control Unit 130

Similarly to the normal state energization control, according to the phase voltage target values Vu_t, Vv_t and Vw_t, the PWM control unit 130 energizes the windings 86 of each phase of the motor 22 by pulse-width modulation (PWM) control through the inverter 36. The PWM control unit 130 energizes the windings 86 of each phase by controlling on and off of the SW elements 74 and 80 of the inverter 36.

As a result, if the abnormal phase is U phase, a current equivalent to the V-phase target current value Iv_t is applied to the V phase, and a current equivalent to the W-phase target current value Iw_t is applied to the W phase. If the abnormal phase is V phase, a current equivalent to the U-phase target current value Iu_t is applied to the U phase, and a current equivalent to the W-phase target current value Iw_t is applied to the W phase. If the abnormal phase is W phase, a current equivalent to the V-phase target current value Iv_t is applied to the V phase, and a current equivalent to the U-phase target current value Jut is applied to the U phase.

C. Effects of Present Embodiment

As described above, the electric power steering device 10 according to the present embodiment includes: the three-phase AC motor 22, having the windings 86u, 86v and 86w of three phases; the inverter 36 (drive circuit), energizing the windings 86u, 86v and 86w of the motor 22 in order to excite the windings; the ECU 50 (drive control device), controlling the inverter 36; the abnormal phase specifying function 102 (abnormal phase detection unit), detecting an abnormal phase being a phase among the three phases in which an abnormality has occurred; and the vehicle speed sensor 30, detecting the vehicle speed V. If the abnormal phase is detected by the abnormal phase specifying function 102, the ECU 50 controls the inverter 36 so as to stop energizing the winding (any one of the windings 86u, 86v and 86w) of the abnormal phase and to energize the windings (two of the windings 86u, 86v and 86w) of the two phases other than the abnormal phase. On that occasion, as the vehicle speed V detected by the vehicle speed sensor 30 increases, the ECU 50 reduces a current value applied to the windings (two of the windings 86u, 86v and 86w) of the two phases other than the abnormal phase.

According to the present embodiment, if the abnormal phase is detected, the energization to the winding (any one of the windings 86u, 86v and 86w) of the abnormal phase is stopped and the windings (two of the windings 86u, 86v and 86w) of the two phases other than the abnormal phase are energized, and, on that occasion, as the vehicle speed V increases, the current value applied to the windings (two of the windings 86u, 86v and 86w) of the two phases other than the abnormal phase is reduced. In this way, in the abnormality occurrence state energization control, since the steering assist force is reduced during high-speed traveling of the vehicle during which the driver feels a sense of incongruity for steering, the driver's sense of incongruity with respect to steering can be eased. In addition, since the steering assist force is reduced during high-speed traveling of the vehicle, the vehicle can travel stably.

Furthermore, if the vehicle speed V detected by the vehicle speed sensor 30 is equal to or higher than the predetermined vehicle speed Vth, the ECU 50 controls the inverter 36 so as to stop energizing the windings (two of the windings 86u, 86v and 86w) of the two phases other than the abnormal phase. In this way, since energization is stopped to set the steering assist force to zero in a situation where the driver feels a sense of incongruity with respect to steering assist during high-speed traveling of the vehicle, the driver's sense of incongruity with respect to steering can be eliminated.

In addition, the electric power steering device 10 according to the present embodiment includes the steering angle sensor 32 detecting the steering angle θs. If the abnormal phase is detected by the abnormal phase specifying function 102, the ECU 50 controls the inverter 36 so as to stop energizing the winding (any one of the windings 86u, 86v and 86w) of the abnormal phase and to energize the windings (two of the windings 86u, 86v and 86w) of the two phases other than the abnormal phase. On that occasion, when the steering angle θs detected by the steering angle sensor 32 is within the first range θs1 (predetermined range) including zero, the ECU 50 reduces the current value applied to the windings (two of the windings 86u, 86v and 86w) of the two phases other than the abnormal phase to be smaller than when the steering angle θs is outside the first range θs1.

According to the present embodiment, if the abnormal phase is detected, the energization to the winding (any one of the windings 86u, 86v and 86w) of the abnormal phase is stopped and the windings (two of the windings 86u, 86v and 86w) of the two phases other than the abnormal phase are energized, and, on that occasion, when the steering angle θs is within the first range θs1 including zero, the current value applied to the windings (two of the windings 86u, 86v and 86w) of the two phases other than the abnormal phase is reduced to be smaller than when the steering angle θs is outside the first range θs1. In this way, in the abnormality occurrence state energization control, since the steering assist force is reduced in the vicinity of the steering angle neutral point at which the driver feels a sense of incongruity for steering, the driver's sense of incongruity with respect to steering can be eased.

Furthermore, if the steering angle θs detected by the steering angle sensor 32 is within the first range θs1, the ECU 50 controls the inverter 36 so as to stop energizing the windings (two of the windings 86u, 86v and 86w) of the two phases other than the abnormal phase. In this way, since energization is stopped to set the steering assist force to zero in the vicinity of the steering angle neutral point at which the driver feels a sense of incongruity with respect to steering assist, the driver's sense of incongruity with respect to steering can be eliminated.

In addition, by the map correction unit 146, the ECU 50 corrects the correction range (range of the electrical angle θ) set for each map M using the gain G1 set according to the vehicle speed V. On this occasion, the range of the electrical angle θ in which the phase instruction current values Iu_i, Iv_i and Iw_i are not the maximum are set as the correction range. In this way, by correcting the map M, a change in current values can be suppressed, and the steering assist force can be stabilized. Hence, the driver's sense of incongruity with respect to steering can be eliminated.

II. Modifications

Moreover, although the maps M (Mvw Mwu and Muv) in which the electrical angle θ is associated with the phase instruction current values Iu_i, Iv_i and Iw_i are used in the abnormality occurrence state energization control explained in the above B.5, a map M in which the electrical angle θ is associated with phase instruction voltage value may also beused.

What is claimed is:

1. An electric power steering device, comprising:
a three-phase alternating current (AC) motor having windings of three phases and an electrical angle;
a drive circuit energizing each of the windings of the motor in order to excite the windings;
a drive control device controlling the drive circuit;
an abnormal phase detection unit detecting an abnormal phase being a phase among the three phases in which an abnormality has occurred;
a correction range set unit setting a correction range of the electrical angle;
a vehicle speed sensor detecting a vehicle speed; and
a steering angle sensor detecting a steering angle, wherein
when the abnormal phase is detected by the abnormal phase detection unit, the drive control device controls the drive circuit so as to stop energizing the winding of the abnormal phase and to energize the windings of the two phases other than the abnormal phase, and the correction range set unit sets the correction range when a current value applied to the windings of the two phases other than the abnormal phase is not a maximum current value,
when the vehicle speed detected by the vehicle speed sensor increases, the drive control device reduces a current value applied to the windings of the two phases other than the abnormal phase, and
when the steering angle detected by the steering angle sensor is within a predetermined range ranging from zero degrees to a value greater than zero degrees, the drive control device reduces a current value applied to the windings of the two phases other than the abnormal phase to be smaller than when the steering angle is outside the predetermined range.

2. The electric power steering device according to claim 1, wherein
when the vehicle speed detected by the vehicle speed sensor is equal to or higher than a predetermined vehicle speed, the drive control device controls the drive circuit so as to stop energizing the windings of the two phases other than the abnormal phase.

3. The electric power steering device according to claim 1, wherein
when the steering angle detected by the steering angle sensor is within the predetermined range, the drive control device controls the drive circuit so as to stop energizing the windings of the two phases other than the abnormal phase.

* * * * *